Patented Mar. 23, 1948

2,438,451

UNITED STATES PATENT OFFICE 2,438,451

ACTIVATION OF CLAY

John J. Owen, Baton Rouge, La., assignor to Standard Oil Development Company, a corporation of Delaware No Drawing. Application August 28, 1943, Serial No. 500,381

3 Claims. (Cl. 252—254)

This invention is concerned with the activation of clays and pertains more particularly to activating clays to produce catalysts for the conversion of hydrocarbon oils.

It is generally known that acid-treated clays of the bentonite type form active catalysts for the conversion of hydrocarbon oils and particularly for carrying out cracking and polymerizing reactions.

The general procedure employed is to digest the clay with an inorganic acid, such as sulfuric acid or hydrochloric acid, to remove the impurities, such as iron oxide and the alkaline earth metal oxides.

I have found that the activity of the catalyst may be materially improved by treating the clay with the acid in a reducing atmosphere such as a hydrogen or carbon monoxide atmosphere. The treating may be carried out in a closed container in which the reducing gas is continuously passed through the chamber, or the treatment may be carried out in a vessel with a quiescent atmosphere of the reducing gas. It is preferred to activate the clay in the presence of hydrogen generated in situ; for example, a small amount of powdered metal capable of generating hydrogen from acids may be incorporated into the clay being activated. Such metals may comprise, for example, aluminum, magnesium, and zinc. The metals employed to generate the hydrogen should be selected so as not to impart any harmful metallic salts into the catalysts. It is desirable in some cases to incorporate a small quantity of metals capable of reacting with the acids to form activating or promoting agents for the catalysts.

The clays activated with acid in a reducing atmosphere are not only more active in their initial state but are more stable and are capable of maintaining their activity over longer periods. The products are also more stable to water vapor and temperature. It will be understood that the clay activated in a reducing atmosphere according to the present invention may serve as a base into which other catalyst components may be incorporated. Such catalytic components may be incorporated into the clay by treating the clay with a salt solution of desired metal and then precipitating the desired component, such as oxide, hydroxide, sulphide, and the like, with a suitable precipitant. For example, from 1 to 5% of alumina may be precipitated on the clay following the acid treatment. Components which serve as active catalytic constituents for other types of hydrocarbon reactions, such as hydrogenation, dehydrogenation, reforming, hydroforming, isomerization, aromatization, and the like, may also be incorporated in a similar manner. The added oxides incorporated into the clay may be of the metals from groups V to VIII of the periodic table of elements.

The invention will be better understood from the following examples, it being understood that the values and conditions given therein are illustrative rather than limitive:

Example 1

A bentonite clay from Mississippi and designated as "Chisholm bentonite" was treated with sulfuric acid diluted to 12% concentration for 6 hours at a temperature from 200° to 212° F. with continuous agitation. The amount of sulfuric acid was 75% of the weight of the clay. During the treating period, granular aluminum was added at 30 minute intervals, the total amount of aluminum being 0.5 grams per pound of raw clay. Hydrogen was liberated during the treating period by the action of the acid on the aluminum. The treated clay was allowed to stand overnight and was thereafter filtered and washed free of sulfates. The washed product was thereafter dried in a steam oven at 175° F. The dried product was formed into pellets and the activity was determined by passing an East Texas gas oil having an A. P. I. gravity of 33.8 through the catalyst mass at a space velocity of 0.6 volume of liquid feed per volume of catalyst per hour at a temperature of 850° F. for a two-hour period. The cracked vapors were cooled to condense the total liquid products. The condensate was thereafter distilled and the amount of product boiling below 400° F. amounted to 51.5% by volume of the original oil.

Example 2

A catalyst was prepared as described in Example 1 except that no hydrogen was generated during the acid treatment. This catalyst, when tested as described in Example 1, gave a gasoline yield of 48 volume per cent.

It will be noted, therefore, that the activation of the clay in the presence of the reducing gas resulted in a substantial improvement in the activity as compared with the activity of a similar catalyst prepared in the absence of reducing gas.

While the invention is especially applicable to the treatment or activation of raw clays, it also finds application in the reactivation of spent clays which have become deactivated by previous service.

When treating raw bentonite clays, the total amount of sulfuric acid employed may range between .5 to 1.5 parts of acid per part of clay. The acid should be diluted to between 2 and 60% concentration, preferably between 6 and 25%.

In cases where the hydrogen is generated in situ by addition of a metal as described in Example 1, the amount of metal added may be between .1 and 1 gram per pound of clay.

I claim:

1. The method of activating bentonite clays which comprises treating said clays for a substantial period of time with an inorganic acid of the group consisting of sulfuric acid and hydrochloric acid and in an amount effective to activate said clays, said treatment being carried out in the presence of a reducing atmosphere of the group consisting of hydrogen and carbon monoxide.

2. A method of activating bentonite clays which comprises treating said clays for a substantial period of time with an acid of the group consisting of sulfuric acid and hydrochloric acid and in a quantity in excess of that required to remove impurities from said clays, and utilizing the excess of said acid to react with a metal of the group consisting of aluminum, magnesium and zinc to generate hydrogen in situ during said treatment.

3. A process of activating bentonite clay which comprises incorporating metallic aluminum into said clay in an amount of between .1 and 1 gram of aluminum per pound of clay, treating the resulting clay for a substantial period of time with an inorganic acid of the group consisting of sulfuric acid and hydrochloric acid, said acid being present in an amount sufficient to substantially remove impurities from said clay and to generate hydrogen by reaction with the metallic aluminum in a volume sufficient to provide a reducing atmosphere for the treated clay.

JOHN J. OWEN.

REFERENCES CITED

The following references are of record in the file of this patent:

UNITED STATES PATENTS

| Number | Name | Date |
| --- | --- | --- |
| 1,642,871 | Chappell | Sept. 20, 1927 |
| 1,752,721 | Bierce | Apr. 1, 1930 |
| 1,837,971 | Joseph | Dec. 22, 1931 |
| 1,884,954 | Zoul | Oct. 25, 1932 |
| 1,913,960 | Roll | June 13, 1933 |
| 1,926,148 | Huber | Sept. 12, 1933 |
| 2,141,185 | Houdry | Dec. 27, 1938 |
| 2,192,000 | Wilson | Feb. 27, 1940 |
| 2,311,318 | Tyson et al. | Feb. 16, 1943 |
| 2,312,230 | Belchetz | Feb. 23, 1943 |
| 2,319,590 | Eastman et al. | May 18, 1943 |
| 2,320,799 | Ruthruff | June 1, 1943 |